United States Patent
Yamamoto et al.

(10) Patent No.: US 8,771,874 B2
(45) Date of Patent: Jul. 8, 2014

(54) NEGATIVE ELECTRODE CONTACTING SILICON OXIDE ACTIVE MATERIAL LAYERS FOR LITHIUM SECONDARY BATTERY AND METHOD FOR PRODUCING THE SAME

(75) Inventors: Taisuke Yamamoto, Nara (JP); Kazuya Iwamoto, Osaka (JP); Yasutaka Kogetsu, Osaka (JP)

(73) Assignee: Panasonic Corporation, Osaka (JP)

( * ) Notice: Subject to any disclaimer, the term of this patent is extended or adjusted under 35 U.S.C. 154(b) by 350 days.

(21) Appl. No.: 12/530,719

(22) PCT Filed: Mar. 13, 2008

(86) PCT No.: PCT/JP2008/000564
§ 371 (c)(1),
(2), (4) Date: Sep. 10, 2009

(87) PCT Pub. No.: WO2008/111315
PCT Pub. Date: Sep. 18, 2008

(65) Prior Publication Data
US 2010/0040951 A1   Feb. 18, 2010

(30) Foreign Application Priority Data
Mar. 13, 2007 (JP) .................. 2007-063939

(51) Int. Cl.
*B05D 5/12* (2006.01)
*C23C 14/16* (2006.01)
*H01M 4/134* (2010.01)
*H01M 10/0525* (2010.01)

(52) U.S. Cl.
USPC ............. 429/218.1; 429/231.95; 427/78; 427/527

(58) Field of Classification Search
USPC .............. 429/231.95, 218.1; 427/78, 527
See application file for complete search history.

(56) References Cited

U.S. PATENT DOCUMENTS

6,432,579 B1   8/2002   Tsuji et al.
7,192,673 B1   3/2007   Ikeda et al.
(Continued)

FOREIGN PATENT DOCUMENTS

EP   1 622 215 A1   1/2006
JP   11-135115   5/1999
(Continued)

OTHER PUBLICATIONS

Hirase et al., Machine translation of JP 2006-073212 A, Mar. 2006.*
(Continued)

*Primary Examiner* — Sean P Cullen
(74) *Attorney, Agent, or Firm* — McDermott Will & Emery LLP

(57) ABSTRACT

The negative electrode for a lithium secondary battery includes: a current collector 11 having a plurality of bumps 11a on a surface thereof; a first active material layer formed on the current collector 11; and a second active material layer 15 disposed on the first active material layer 12 and including a plurality of active material particles 14. Each of the plurality of active material particles 14 is located on a corresponding bump 11a of the current collector 11, and each of the first active material layer 12 and the plurality of active material particles 14 has a chemical composition represented as $SiO_x$ (0<x<1).

12 Claims, 5 Drawing Sheets

(56) References Cited

U.S. PATENT DOCUMENTS

| | | |
|---|---|---|
| 2002/0177044 A1 | 11/2002 | Yagi et al. |
| 2003/0027050 A1 | 2/2003 | Okamoto et al. |
| 2003/0138554 A1 | 7/2003 | Yagi et al. |
| 2004/0142242 A1 | 7/2004 | Kawase et al. |
| 2005/0048369 A1 | 3/2005 | Koshina et al. |
| 2005/0074671 A1 | 4/2005 | Sugiyama et al. |
| 2005/0118503 A1 | 6/2005 | Honda et al. |
| 2005/0153208 A1 | 7/2005 | Konishiike et al. |
| 2005/0221189 A1 | 10/2005 | Yoshida et al. |
| 2006/0099507 A1 | 5/2006 | Kogetsu et al. |
| 2006/0134518 A1 | 6/2006 | Kogetsu et al. |
| 2006/0159997 A1 | 7/2006 | Sunagawa et al. |
| 2007/0031733 A1* | 2/2007 | Kogetsu et al. ............... 429/245 |
| 2007/0166613 A1* | 7/2007 | Kogetsu et al. ............ 429/218.1 |
| 2007/0207386 A1 | 9/2007 | Konishiike et al. |
| 2008/0020281 A1* | 1/2008 | Kogetsu et al. ............ 429/231.5 |
| 2009/0117462 A1* | 5/2009 | Okazaki et al. ............ 429/218.1 |

FOREIGN PATENT DOCUMENTS

| | | |
|---|---|---|
| JP | 11-339777 | 12/1999 |
| JP | 2002-083594 | 3/2002 |
| JP | 2002-319408 | 10/2002 |
| JP | 2002-373644 | 12/2002 |
| JP | 2003-217576 | 7/2003 |
| JP | 2003-303586 | 10/2003 |
| JP | 2004-127561 | 4/2004 |
| JP | 2005-141991 | 6/2005 |
| JP | 2005-196970 | 7/2005 |
| JP | 2005-293899 | 10/2005 |
| JP | 2005-332797 | 12/2005 |
| JP | 2006-073212 | 3/2006 |
| JP | 2006-107912 | 4/2006 |
| JP | 2006-196447 | 7/2006 |
| JP | 2006-269306 | 10/2006 |
| JP | 2006-278104 | 10/2006 |
| JP | 2006-284918 | 10/2006 |
| WO | WO 2007/015419 A1 | 2/2007 |

OTHER PUBLICATIONS

European Search Report issued in European Patent Application No. 07714089.5-1227, mailed Oct. 1, 2009.

Robbie, et al. "Advanced Techniques for Glancing Angle Deposition". J. Vac. Sci. Technology. 16(3), 1115-1122.

Furuyui, et al, JP 2007-194076 Translation, Publication Date Feb. 8, 2007.

US Office Action issued in U.S. Appl. No. 12/847,727 dated May 4, 2012.

European Search Report issued in European Patent Application No. 08720450.9 dated Nov. 4, 2013.

* cited by examiner (a)

(b)

(c)

(d)

(e)

(a)

(b)

(a)

(b)

NEGATIVE ELECTRODE CONTACTING SILICON OXIDE ACTIVE MATERIAL LAYERS FOR LITHIUM SECONDARY BATTERY AND METHOD FOR PRODUCING THE SAME

RELATED APPLICATIONS

This application is the U.S. National Phase under 35 U.S.C. §371 of International Application No. PCT/JP2008/000564, filed on Mar. 13, 2008, which in turn claims the benefit of Japanese Application No. 2007-063939, filed on Mar. 13, 2007, the disclosures of which Applications are incorporated by reference herein.

TECHNICAL FIELD

The present invention relates to a negative electrode for a lithium secondary battery and a method of producing the same, as well as a lithium secondary battery having a negative electrode for a lithium secondary battery.

BACKGROUND ART

In recent years, with the development of portable devices such as personal computers and mobile phones, there is an increasing need for batteries as their power supplies. Batteries to be used for such purposes are required to have a high energy density. Against such requirements, lithium secondary batteries are drawing attention, and active materials which have a higher capacity than conventionally are being developed for either their positive electrodes or their negative electrodes. Among others, an elemental, oxide, or alloy form of silicon (Si) or tin (Sn) is regarded as a promising negative-electrode active material which can provide a very high capacity.

However, when a negative electrode for a lithium secondary battery is constructed by using such negative-electrode active materials, there is a problem in that the negative electrode will be deformed through repetition of charging and discharging. The aforementioned negative-electrode active materials undergo significant volumetric changes when reacting with lithium ions. Therefore, at the time of charging and discharging, the negative-electrode active material will undergo significant expansion/contraction due to reactions of insertion and desorption of lithium ions with respect to the negative-electrode active material. Therefore, when charging and discharging are repeated, a large stress will occur in the negative electrode to cause strain, thus resulting in wrinkles, cuts, and the like. Moreover, when the negative electrode is strained and deformed, a space may be created between the negative electrode and the separator, so that the charging and discharging reaction may become nonuniform, thus locally deteriorating the battery characteristics. Therefore, it has been difficult to obtain a lithium secondary battery having sufficient charge-discharge cycle characteristics by using the aforementioned negative-electrode active material.

In order to solve the above problems, Patent Document 1 proposes forming a plurality of pillar-like active material particles of silicon on a current collector. With this construction, a space for alleviating the expansion stress of silicon can be guaranteed between active material particles, whereby deformation of the negative electrode can be reduced and deterioration of cycle characteristics can be reduced. Moreover, Patent Document 2 proposes an electrode structure in which, on a current collector, a plurality of pillar-like member are placed in a regular arrangement which are composed of an active material that forms an alloy with lithium. In this electrode structure, too, the pillar-like members expand so as to fill in the voids between pillar-like members, so that deterioration in electrode characteristics due to expansion stress can be reduced.

In the negative electrodes proposed in Patent Documents 1 and 2, a plurality of pillar-like active material particles or active material members are selectively formed on the current collector surface, these active material particles or active material members standing upright along the normal direction of the current collector. However, in a lithium secondary battery having such a negative electrode, a large part of the positive electrode active material layer is not opposing the active material particles or active material members composed of a negative-electrode active material, but opposes portions of the current collector surface that are not covered with the active material (which may be called "exposed portions of the current collector"). Therefore, the lithium which is supplied from the positive electrode active material layer at charging is likely to deposit at the exposed portions of the negative electrode current collector, without being occluded by the negative-electrode active material. Therefore, lithium is unlikely to be efficiently released from the negative electrode at discharging, so that the charge-discharge efficiency may be deteriorated.

On the other hand, Patent Document 3 and Patent Document 4 of the Applicant proposes, in a negative electrode in which a plurality of pillar-like active material particles of a negative-electrode active material are formed on a current collector, tilting the longitudinal direction of the active material particles relative to the normal direction of the current collector surface. With this construction, the proportion of the portions of the positive electrode active material layer that oppose the exposed portions of the current collector can be made small, thus making it possible to sufficiently utilize the positive-electrode active material and the negative-electrode active material, whereby a higher capacity retention rate than those of Patent Document 1 and Patent Document 2 can be obtained.

[Patent Document 1] Japanese Laid-Open Patent Publication No. 2003-303586
[Patent Document 2] Japanese Laid-Open Patent Publication No. 2004-127561
[Patent Document 3] Japanese Laid-Open Patent Publication No. 2005-196970
[Patent Document 4] pamphlet of International Publication No. 2007/015419

DISCLOSURE OF INVENTION

Problems to be Solved by the Invention

In the constructions proposed in Patent Document 3 and Patent Document 4, the area of contact between each active material particle and the current collector surface is small because of the pillar-like active material particles being formed on the current collector surface, so that a sufficient adhesion may not be achieved between each active material particle and the current collector. Therefore, when charging and discharging are repeated, active material particles may peel or drop off the current collector due to the difference in expansion coefficient between the active material particles and the current collector, possibly deteriorating the charge-discharge characteristics.

The present invention has been made in view of the above circumstances, and an objective thereof is to reduce deformation of a negative electrode due to an expansion stress in the negative-electrode active material, and reduce peeling and dropping of the negative-electrode active material from a current collector, thereby improving the charge-discharge cycle characteristics of a lithium secondary battery.

Means for Solving the Problems

A negative electrode for a lithium secondary battery according to the present invention includes: a current collector having a plurality of bumps on a surface thereof; a first active material layer formed on the current collector; and a second active material layer being formed on the first active material layer and including a plurality of active material particles. Each of the plurality of active material particles is located on a corresponding bump of the current collector, and each of the first active material layer and the plurality of active material particles has a chemical composition represented as $SiO_x$ (0<x<1).

In accordance with a negative electrode for a lithium secondary battery of the present invention, since the first active material layer is formed between the active material particles and the current collector, adhesion between the active material particles and the current collector can be greatly improved as compared to the case where only active material particles are formed on the current collector. Therefore, peeling of the active material particles from the current collector surface can be suppressed.

Moreover, the interval between active material particles and the volumetric ratio of voids (voidage) occupying the second active material layer can be controlled by the plurality of bumps on the current collector surface. Therefore, at charging, even if the active material particles and the first active material layer expand as they occlude lithium ions, spaces for their expansion are guaranteed between active material particles. Thus, the expansion stress acting on the current collector is alleviated, whereby deformation of the negative electrode through repetitive charging and discharging can be suppressed.

As described above, deformation of the negative electrode and peeling of the active material particles from the current collector through repetitive charging and discharging can be prevented, whereby the charge-discharge cycle characteristics of the lithium secondary battery can be improved. Moreover, an increase in the irreversible capacity of the lithium secondary battery associated with peeling of the active material particles can be reduced.

Furthermore, since the first active material layer and the active material particles have a chemical composition represented as $SiO_x$ (0<x<1), a sufficient charge-discharge capacity can be obtained. Moreover, by providing the first active material layer on the current collector surface, the proportion of the portions (exposed portions) of the current collector surface that are not covered by the active material can be reduced as compared to the case where only the active material particles are formed on the current collector. Therefore, by constructing a lithium secondary battery using the negative electrode of the present invention, it is possible to suppress deterioration in the charge-discharge efficiency due to lithium depositing on the plane at which the positive electrode active material layer and the exposed portions of the current collector oppose each other.

Effects of the Invention

According to the present invention, by providing a first active material layer between a current collector and active material particles, adhesion between the active material particles and the current collector can be improved, whereby peeling of the active material particles from the current collector can be suppressed. Moreover, by allowing each active material particle to be located on a corresponding bump on the current collector surface, spaces for the active material particles and the first active material layer to expand are guaranteed between active material particles, so that expansion stress can be alleviated and deformation of the negative electrode due to expansion stress can be reduced. Thus, the charge-discharge cycle characteristics of a lithium secondary battery can be improved.

Figure 1:
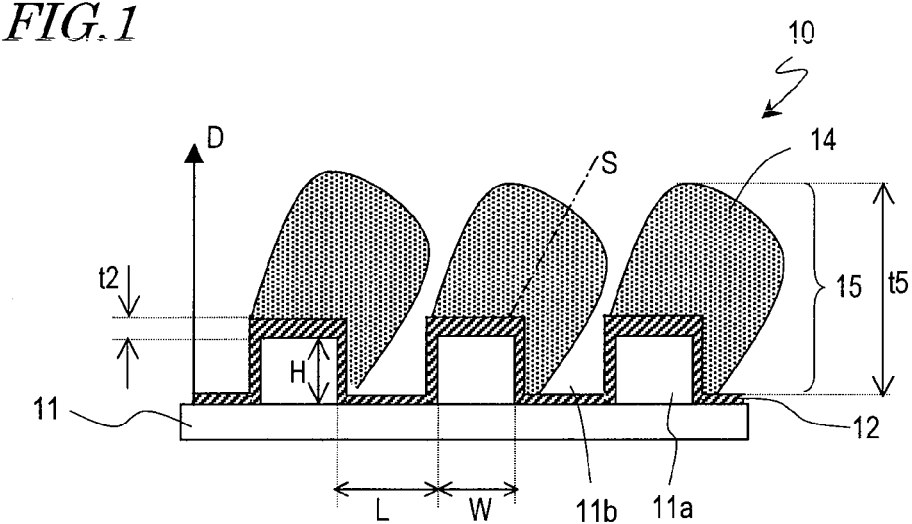
FIG. 1 A schematic cross-sectional view showing a negative electrode for a lithium-ion secondary battery according to an embodiment of the present invention.

DESCRIPTION OF REFERENCE NUMERALS 10 negative electrode
11 current collector
11a bump
H height of bump
W width of upper face of bump
L distance between adjoining bumps
12 first active material layer
14 active material particles
15 second active material layer
50 lithium-ion secondary battery
31 case
32 positive electrode current collector
33 positive electrode mixture layer
34 separator
35 sealing plate 36 negative electrode active material layer
37 negative electrode current collector
38 gasket
39 positive electrode
40 negative electrode
60 vapor deposition apparatus
62 chamber
63 platform
64 nozzle
65 tubing
66 evaporation source
67 current collector (sample) on which first active material layer is formed

BEST MODE FOR CARRYING OUT THE INVENTION

Hereinafter, with reference to the drawings, a preferred embodiment of a negative electrode for a lithium secondary battery according to the present invention will be described.

First, FIG. 1 is referred to. FIG. 1 is a schematic cross-sectional view of a negative electrode for a lithium secondary battery (which hereinafter may be referred to as a "negative electrode") of the present embodiment.

A negative electrode 10 includes a current collector 11, a first active material layer 12 formed on the surface of the current collector 11, and a second active material layer 15 which is formed on the first active material layer 12 and includes a plurality of active material particles 14. On the surface of the current collector 11, a plurality of bumps 11a are placed in a regular arrangement. The bumps 11a are defined by grooves 11b which are formed on the surface of the current collector 11. The first active material layer 12 is formed so as to cover the surface of the current collector 11, and has a chemical composition represented as $SiO_x$ ($0<x<1$). The plurality of active material particles 14 are provided via the first active material layer 12 on the corresponding bumps 11a of the current collector 11, and have a chemical composition represented as $SiO_x$ ($0<x<1$). The growth direction S of each active material particle 14 is tilted with respect to the normal direction D of the current collector 11. The normal direction D of the current collector 11 refers to a direction perpendicular to an imaginary plane which is obtained by averaging out the ruggednesses on the surface of the current collector 11.

In the present specification, the aforementioned x in the chemical compositions of the active material particles 14 and the first active material layer 12 each represents an average value of a molar ratio of the oxygen amount, with respect to the silicon amount, in the active material particles 14 or the first active material layer 12 (which hereinafter may be simply referred to as an "oxygen ratio"). Note that the chemical compositions of the active material particles 14 and the first active material layer 12 are meant as compositions excluding any lithium that may have been added to or occluded by the active material particles 14 and the first active material layer 12. It suffices if the active material particles 14 and the first active material layer 12 are substantially of the aforementioned chemical composition, and they may contain impurities such as Fe, Al, Ca, In, and Ti.

In the negative electrode 10 of the present embodiment, generally the entire surface of the current collector 11 is covered with the first active material layer 12, and there is a large area of contact between the first active material layer 12 and the current collector 11. Therefore, the adhesion between the first active material layer 12 and the current collector 11 is very high. Moreover, the active material particles 14 are in contact with the first active material layer 12, and therefore are less likely to peel through repetitive charging and discharging than in a construction where the active material particles 14 are in contact with the current collector 11. The reason is that the first active material layer 12 and the active material particles 14 both have a chemical composition represented as $SiO_x$ ($0<x<1$), and therefore the difference in coefficient of volumetric expansion between them due to charging and discharging is small. Thus, the first active material layer 12 and the active material particles 14 are restrained from peeling from the current collector 11.

Furthermore, the plurality of active material particles 14 are not formed on the grooves 11b, but are formed on the bumps 11a via the first active material layer 12, the bumps 11a being disposed on the surface of the current collector 11 with a predetermined interval. This secures spaces for expansion of the active material particles 14 in between the active material particles 14, whereby the stress occurring due to an expansion and contraction of the active material particles 14 that is associated with charging and discharging of the battery can be alleviated, and deformation of the negative electrode can be suppressed.

Thus, according to the present embodiment, peeling of the active material from the current collector 11 and deformation of the negative electrode through repetitive charging and discharging can be suppressed, whereby a secondary battery which has excellent charge-discharge cycle characteristics and reliability can be provided.

The chemical compositions of the first active material layer 12 and the active material particles 14 are represented as $SiO_x$ ($0<x<1$). As described earlier, the aforementioned x is an average value of the molar ratio of the oxygen amount (oxygen ratio) relative to the silicon amount. Generally speaking, in a negative-electrode active material containing silicon, as the oxygen ratio increases, the theoretical capacity will decrease but the coefficient of volumetric expansion due to charging will become smaller. Since x is greater than 0 in the present embodiment, expansion and contraction due to charging and discharging is suppressed as compared to silicon ($x=0$). As a result, deterioration in charge-discharge cycle characteristics due to an expansion stress of the first active material layer 12 and the active material particles 14 can be suppressed. On the other hand, if the x value becomes too large, the output characteristics will be deteriorated due to a reduced electron conductivity and an increased plate resistance. Since x is less than 1 in the present embodiment, the plate resistance can be kept small.

Preferably, the x value in the chemical composition of the first active material layer 12 is no less than 0.5 but less than 1.0. When x is no less than 0.5, expansion and contraction due to charging and discharging can be suppressed more effectively. When x is less than 1.0, the plate resistance can be kept even lower, and yet a high theoretical capacity can be obtained.

Moreover, it is preferable that the x value in the chemical composition of the active material particles 14 is no less than 0.05 and no more than 0.7. The x value needs to be reduced in order to ensure a capacity of the active material. When the x value is no more than 0.7, a high capacity can be achieved. Note that the x values in the first active material layer 12 and the active material particles 14 may be equal or different.

In the present embodiment, the oxygen concentration profiles in the first active material layer 12 and the active material particles 14 may vary along the thickness direction. In such cases, too, it suffices if the average values x of the molar ratios of the oxygen amounts (oxygen ratios) in the first active material layer 12 and the active material particles 14 relative to the silicon amount are within the aforementioned ranges.

In the construction shown in FIG. 1, the first active material layer 12 is formed so as to cover the entire surface of the current collector 11, and its thickness t2 is generally uniform across the surface of the current collector 4. As used herein, "the entire surface of the current collector 11" also includes the upper faces and side faces of the bumps 11a formed on the surface of the current collector 11. Thus, the first active material layer 12 being formed on the entire surface of the current collector 11 is advantageous because not only the area of contact between the current collector 11 and the first active material layer 12 is increased, but also the active material particles 14 can be disposed on the first active material layer 12 with an increased certainty. Presumably, if any portion exists on the surface of the current collector 11 where the first active material layer 12 is not formed, the first active material layer 12 will be likely to peel near that portion; according to the illustrated construction, however, the first active material layer 12 covers the entire surface of the current collector 11, thereby effectively suppressing peeling of the first active material layer 12.

It suffices if the first active material layer 12 in the present embodiment is disposed between the current collector 11 and the active material particles 14 so as to prevent the current collector 11 and the active material particles 14 from being in direct contact, and the first active material layer 12 does not need to cover the entire surface of the current collector 11. For example, it may be locally removed as necessary in order to provide a lead portion for current collection purposes or the like. Moreover, the thickness t2 of the first active material layer 12 does not need to be generally uniform, either. In that case, too, peeling of the active material particles 14 from the current collector 11 can be effectively suppressed so long as the area of contact between the current collector 11 and the first active material layer 12 is sufficiently greater than the area of contact between the active material particles 14 and the first active material layer 12.

Preferably, the thickness t2 of the first active material layer 12 is no less than 0.01 µm and no more than 3 µm. The reason is that, if the thickness t2 of the first active material layer 12 is less than 0.01 µm, the strength of the first active material layer 12 is reduced, so that the first active material layer 12 may be destroyed through repetitive charging and discharging, thus making it impossible to sufficiently improve the adhesive strength between the first active material layer 12 and the current collector 11. On the other hand, if the thickness t2 of the first active material layer 12 exceeds 3 µm, the expansion stress of the first active material layer 12 at charging and discharging is increased, thus possibly generating wrinkles, cuts, and the like in the negative electrode 10. More preferably, the thickness t2 is no less than 0.01 µm and no more than 1 µm, and still more preferably no less than 0.01 µm and no more than 0.7 µm, whereby the adhesive strength between the first active material layer 12 and the current collector 11 can be ensured while making the expansion stress in the first active material layer 12 even smaller. The thickness t2 of the first active material layer 12 does not need to be generally uniform across the entire surface of the current collector 11; for example, it may be thinner at the side faces and thicker at the upper faces of the bumps 11a. In that case, for example, it is preferable that the thickness of the portions of the first active material layer 12 that are located upon the upper faces of the bumps 11a falls within the aforementioned range of thickness t2.

The thickness t2 of the first active material layer 12 can be easily measured by using electron microscopy, for example.

Note that, if the interface between the first active material layer 12 and the active material particles 14 cannot be identified because their chemical compositions are generally the same, the thickness of the portions of the first active material layer 12 that are located upon the grooves 11b of the current collector 11 may be measured as the thickness t2 of the first active material layer 12.

As shown in FIG. 1, it is preferable that the active material particles 14 have a growth direction S which is tilted with respect to the normal direction D of the current collector 11. With such a construction, in a lithium secondary battery, the area of the portions of the positive electrode active material layer that oppose the active material particles 14 can be increased, whereby the charge-discharge efficiency can be enhanced. Such active material particles 14 can be formed by, in a chamber into which oxygen gas has been introduced, allowing silicon to strike the surface of the current collector 3 from a direction which is tilted with respect to the normal direction of the current collector 3 (oblique vapor deposition), for example.

Preferably, the angle between the growth direction S of the active material particles 14 and the normal direction D of the current collector 3 is 10° or more. When this angle is 10° or more, the area of the portions of the positive electrode active material layer that oppose the active material particles 14 can be sufficiently increased, whereby the charge-discharge efficiency can be enhanced with an increased certainty. On the other hand, it is supposed that the angle is less than 90°; however, the angle is preferably less than 80° because it becomes more difficult to form the active material particles 14 as the angle becomes closer to 90°.

Note that the active material particles 14 of the present embodiment may be allowed to grow along the normal direction D of the current collector 11. As described earlier, in the negative electrode disclosed in Patent Document 1, active material particles stand upright along the normal direction of the current collector; this results in a problem in that, when a lithium secondary battery is constructed, portions of the positive electrode active material layer oppose exposed portions of the current collector (the portions of the current collector surface that are not covered with the active material), thereby deteriorating the charge-discharge efficiency. On the other hand, according to the present embodiment, the surface of the current collector 11 is covered with the first active material layer 12, and is not exposed. Therefore, even if the active material particles 14 are not tilted with respect to the normal direction D, deterioration in the charge-discharge efficiency due to the positive electrode active material layer opposing exposed portions of the current collector can be prevented.

In the construction shown in FIG. 1, one active material particle 14 is provided on the surface of each bump 11a of the current collector 11 via the first active material layer 12. However, a plurality of active material particles 14 may be provided on the surface of one bump 11a. In that case, too, spaces for expansion of the active material particles 14 can be obtained above the grooves 11b because no active material particles 14 are present above the grooves 11b of the current collector 11.

The thickness t5 of the second active material layer 15 is equal to the thickness of the active material particles 14. Although there is no particular limitation, the thickness t5 is preferably no less than 0.5 µm and no more than 50 µm from standpoints such as energy density, producibility, and reliability of the battery. When the thickness t5 of the second active material layer 15 is 0.5 µm or above, and more preferably 5 µm or above, a higher battery energy can be obtained. When the thickness t5 is 50 µm or lower, and more preferably 30 µm or lower, it is possible to reduce the cracks occurring when forming the active material particles 14, whereby the reliability of the negative electrode 10 can be enhanced.

The active material contained in the first active material layer 12 and the active material particles 14 may be crystalline, e.g., single-crystalline, polycrystalline, or microcrystalline, or may be amorphous. As used herein, a "polycrystalline active material" includes a plurality of crystallites (crystal grains) sized 100 nm or larger, and a "microcrystalline active material" includes a plurality of crystallites sized 100 nm or smaller. The confirmation as to whether an active material that is contained in the first active material layer 12 or the active material particles 14 is amorphous or microcrystalline can be made by using X-ray diffraction (XRD), transmission electron microscope (TEM), or the like, for example. For example, if only a broad halo pattern is observed and no sharp peak is observed in a diffraction pattern which is obtained through an XRD measurement of the first active material layer 12 or the active material particles 14, the first active material layer 12 or the active material particles 14 can be determined as substantially amorphous.

The current collector 11 in the present embodiment can be obtained by forming a regular ruggedness pattern including the grooves 11b and the plurality of bumps 11a on the surface of a metal foil, e.g., copper, copper alloy, titanium, nickel, or stainless steel, although there is no particular limitation. As the metal foil, a metal foil such as a rolled copper foil, a rolled copper alloy foil, an electrolytic copper foil, or an electrolytic copper alloy foil is suitably used, for example. For example, the thickness of the metal foil before the ruggedness pattern is formed thereon is preferably no less than 1 µm and no more than 50 µm, although there is no particular limitation. Volumetric efficiency can be ensured at 50 µm or lower, and handling of the current collector 11 is facilitated at 1 µm or above. Moreover, there is no particular limitation as to the method of forming a ruggedness pattern; a cutting technique, a plating technique, a transfer technique, or the like can be used.

When such a regular ruggedness pattern is formed on the surface of the current collector 11, the surface of the first active material layer 12 will also have a conforming pattern. When silicon oxide is grown on the first active material layer 12 as such via the aforementioned oblique vapor deposition, it is possible to selectively form the active material particles 14 only on the bumps 11a, by utilizing a shadowing effect. The shadowing effect will be described in detail later. Thus, by appropriately selecting the shape, size, arraying pitch, and the like of the bumps 11a or grooves 11b in the ruggedness pattern, the layout and interval of the active material particles 14 can be adjusted, and the volumetric ratio (voidage) of the voids occupying the second active material layer 15 can be controlled, and deformation of the negative electrode 10 due to expansion of the active material particles 14 can be effectively suppressed. Note that an example of the construction and method of producing the ruggedness pattern is also described in a patent application (Japanese Patent Application No. 2006-284918) of the Applicant of the present application, which is yet to be laid-open.

The bumps 11a according to the present embodiment are not limited to the pillar-like members as shown in FIG. 1. An orthogonal projection image of the bumps 11a as seen from the normal direction D of the current collector 11 may be a polygon such as a square, a rectangle, a trapezoid, a diamond shape or a parallelogram, a circle, an ellipse, or the like. Moreover, the shape of the bumps 11a in a cross section which is perpendicular to the surface of the current collector 11 may be a polygon, a semicircular shape, an arc shape, for example. The height H of the bumps 11a is no less than 2 µm and no more than 20 µm, for example.

The width W of a bump 11a at its upper face is preferably 50 µm or less, whereby the deformation of the negative electrode 10 due to expansion stress of the active material particles 14 can be effectively reduced. More preferably, it is 20 µm or less. On the other hand, it is preferable that the width W is 1 µm or more because, if the width W of the upper face of a bump 11a is too small, a sufficient area of contact may not be secured between the active material particles 14 and the first active material layer 12. Furthermore, in the case where the bumps 11a are pillar-like member having side faces which are perpendicular to the surface of the current collector 11, the distance L between adjoining bumps 11a, i.e., the width of a groove 11b, is preferably 30% or more, and more preferably 50% or more, of the width W of a bump 11a, whereby sufficient voids can be secured between active material particles 14 to greatly alleviate the expansion stress. On the other hand, the distance L is preferably 250% or less, and more preferably 200% or less, of the width W of a bump 11a because, if the distance L between adjoining bumps 11a is too large, the thickness of the active material particles 14 will be increased in order to ensure a capacity. Note that the width W of the upper face of a bump 11a and the distance L between adjoining bumps 11a refer to, respectively, a width and a distance in a cross section which is perpendicular to the surface of the current collector 11 and contains the growth direction of the active material particles 14.

Moreover, the upper face of each bump 11a may be flat, but preferably has ruggednesses, preferably with a surface roughness Ra of no less than 0.3 µm and no more than 5.0 µm.

As used herein, the "surface roughness Ra" refers to "arithmetic mean roughness Ra" as defined under the Japanese Industrial Standards (JISB 0601-1994), and can be measured by using a surface roughness measurement system or the like. When the upper face of each bump 11a has ruggednesses with a surface roughness Ra of 0.3 µm or more, the first active material layer 12 formed thereon will also have similar surface ruggednesses, thus making it easy for the active material particles 14 to grow on the bumps 11a. As a result, sufficient voids can be formed between active material particles 14 with a certainty. On the other hand, if the surface roughness Ra is too large, the current collector 11 will become thick, and therefore the surface roughness Ra is preferably 5.0 µm or less. Furthermore, when the surface roughness Ra of the current collector 11 is within the aforementioned range (no less than 0.3 µm and no more than 5.0 µm), sufficient adhesion force between the current collector 11 and the first active material layer 12 can be ensured, whereby peeling of the first active material layer 12 can be prevented.

Note that, although the bumps 11a are placed in a regular arrangement on the surface of the current collector 11 of the present embodiment, the effects of the present invention can be obtained even if the bumps 11a are not placed in a regular arrangement.

The negative electrode of the present embodiment is not limited to the construction shown in FIG. 1. For example, each active material particle 14 does not need to be a particle that has grown in one direction, but may have a plurality of portions with different growth directions S. Hereinafter, another exemplary construction of the negative electrode of the present embodiment will be described.

Figure 2:
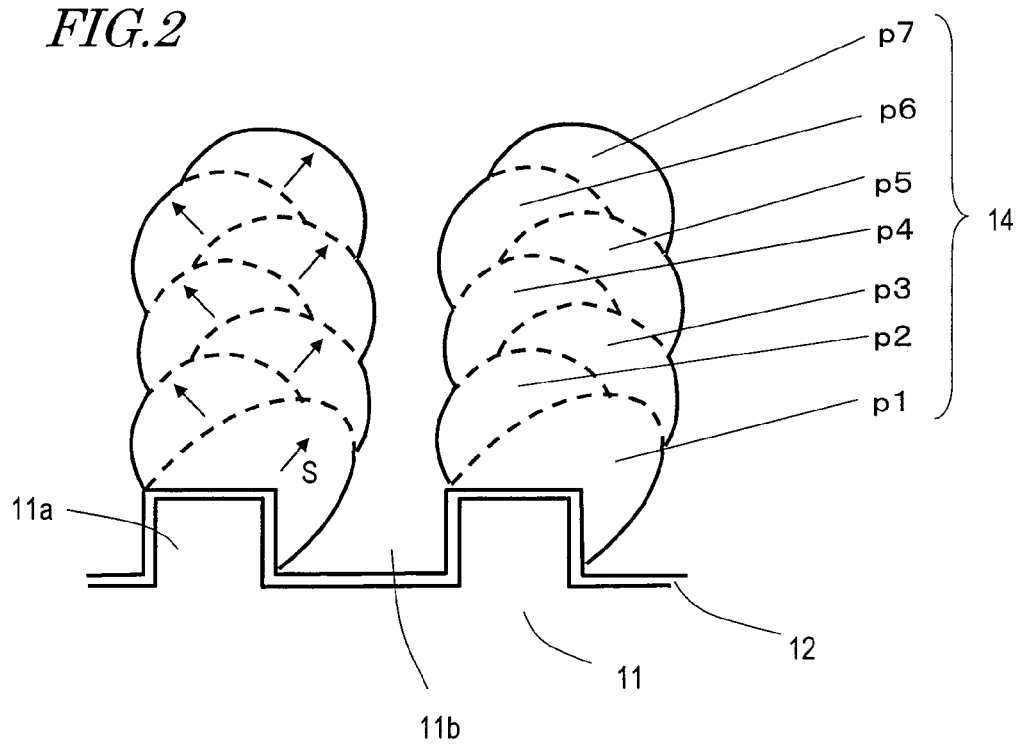
FIG. 2 A schematic cross-sectional view illustrating a negative electrode for a lithium-ion secondary battery according to another embodiment of the present invention.

FIG. 2 is a schematic cross-sectional view showing another construction of the negative electrode of the present embodiment. In the example shown in FIG. 2, the active material particles 14 are divided into seven portions p1 to p7 based on the growth direction S. Such active material particles 14 can be obtained by performing a plurality of steps of vapor deposition by varying the evaporation direction. The growth directions of the plurality of portions p1 to p7 of each active material particle 14 may all be different. Moreover, the growth directions of the plurality of portions p1 to p7 may be identical between active material particles, or different from active material particle to active material particle. Furthermore, in the case where a negative electrode having the first active material layer 12 and the active material particles 14 formed thereon is to be formed on each of both faces the current collector 11, the structure (growth direction, thickness, and the like) of the active material particles 14 formed on each face may be the same or different.

Next, a method of producing the negative electrode of the present embodiment will be described. The production method of the present embodiment includes a step of forming a first active material layer on the surface of a current collector and a step of forming a plurality of active material particles on the first active material layer to obtain a second active material layer. The formation of the first active material layer is preferably performed by a sputtering technique or a vacuum process such as a vapor deposition technique. Among vacuum processes, the vapor deposition technique, which provides a high film formation rate, is suitably used for the formation of the second active material layer, because it is necessary to increase the thickness of the second active material layer in order to ensure battery capacity.

Hereinafter, with reference to the drawings, the method for producing the negative electrode 10 shown in FIG. 1 will be specifically described. FIGS. 3(a) to (e) are step-by-step cross-sectional views for describing the method of producing the negative electrode 10.

Figure 3:
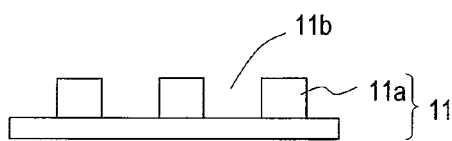
FIG. 3 (a) to (e) are schematic step-by-step cross-sectional views for describing a production method of a negative electrode for a lithium-ion secondary battery according to an embodiment of the present invention.
Figure 3:
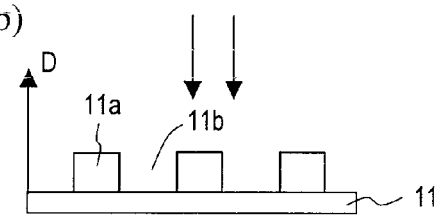
Figure 3:
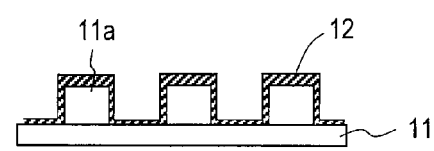
Figure 3:
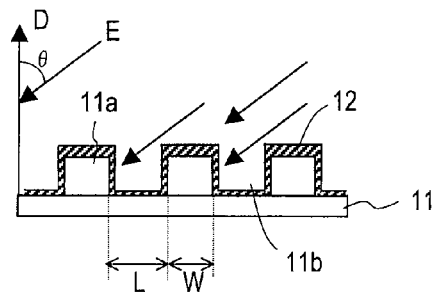
Figure 3:
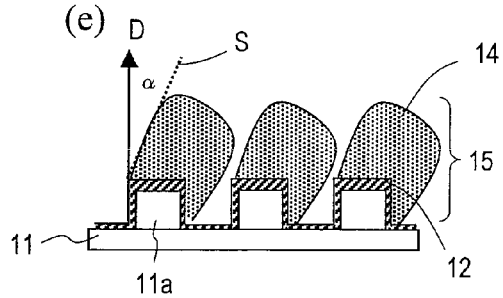

First, as shown in FIG. 3(a), a current collector 11 having a plurality of bumps 11a on its surface is produced. Such a current collector 11 may be produced by providing a predetermined pattern of grooves 11b on the surface of a metal foil (Cu foil) by using a cutting technique, or by forming a plurality of bumps 11a on the surface of a metal foil by a plating technique or a transfer technique, for example.

Next, as shown in FIG. 3(b), the current collector 11 is placed into a vacuum chamber, and silicon is allowed to enter along the normal direction D of the surface of the current collector 11. At this time, oxygen gas is introduced into the vacuum chamber and silicon is allowed to enter in the presence of oxygen, whereby silicon oxide can be deposited on the surface of the current collector 11 (reactive sputtering or reactive evaporation).

In this manner, as shown in FIG. 3(c), the first active material layer 12 covering the entire surface of the current collector 11 is obtained. The first active material layer 12 has the chemical composition $SiO_x$ (0<x<1). The x value in the chemical composition of the first active material layer 12 and the thickness of the first active material layer 12 are controlled by adjusting the output power, time, amount of oxygen gas to be introduced into the vacuum chamber (i.e., the ambient oxygen concentration), etc., during the film formation.

Next, the current collector 11 having the first active material layer 12 formed thereon is placed in a vacuum chamber, and, as shown in FIG. 3(d), silicon is allowed to strike the surface of the current collector 11 from an incident direction E which is at an angle (incident angle) θ with respect to the normal direction D of the current collector 11. Again, by introducing oxygen gas into the vacuum chamber and allowing silicon to enter in the presence of oxygen, it becomes possible to vapor-deposit silicon on the surface of the current collector 11 while allowing the silicon to react with oxygen (reactive evaporation).

At this time, since Si atoms strike the surface of the current collector 11 from the specific direction E, the Si atoms are likely to be vapor-deposited upon the bumps 11a on the surface of the current collector 11, so that silicon oxide grows in the form of pillars on the bumps 11a. Therefore, on the surface of the current collector 3, regions are created which are shaded by the bumps 11a and by the silicon oxide growing in pillar forms and in which Si atoms will not enter and silicon oxide will not be vapor-deposited (shadowing effect). In the illustrated example, because of this shadowing effect, Si atoms do not adhere and silicon oxide does not grow on the grooves 11b between adjoining bumps 11a.

In this manner, as shown in FIG. 3(e), the active material particles 14 can be selectively grown on the bumps 11a of the current collector 11 via the first active material layer 12, thereby obtaining the second active material layer 15 composed of the plurality of active material particles 14. The growth direction α of the active material particles 14 is determined by the incident angle θ of silicon atoms. Specifically, the growth direction α and the incident angle θ satisfy the relationship $2\tan\alpha = \tan\theta$. The resultant active material particles 14 have the chemical composition $SiO_x$ (0<x<1). The x value in the chemical composition of the active material particles 14 and the thickness of the second active material layer 15 are controlled by adjusting the output power, time, amount of oxygen gas to be introduced into the vacuum chamber (i.e., the ambient oxygen concentration), etc., during the vapor deposition.

In the above method, in order to selectively grow active material particles on the bumps 11a by utilizing the shadowing effect, it is preferable that the relationship between the incident angle θ of the Si atoms with respect to the normal direction D of the current collector 11, the height H of the bumps 11a formed on the surface of the current collector 11, and the distance L between the adjoining bumps 11a satisfies $L < H \cdot \tan\theta$. When Si atoms are allowed to enter at an angle θ that satisfies the above relationship, the entire bottom face of the grooves 11b will be shaded by the bumps 11a, so that Si atoms do not strike upon the grooves 11b. As a result, silicon oxide can be vapor-deposited only on the bumps 11a via the first active material layer 12.

On the other hand, when $L \geq H \cdot \tan\theta$, portions of the grooves 11b are not shaded by the bumps 11a, thus leaving a possibility that silicon oxide is vapor-deposited also on the grooves 11b. However, silicon oxide is easier to be vapor-deposited on the bumps 11a than on the grooves 11b, so that silicon oxide grows rapidly. Since the growth direction α of silicon oxide and the incident angle θ satisfy the relationship $2\tan\alpha = \tan\theta$ as mentioned above, the region that is shaded with respect to the incident direction E of Si atoms will increase as the silicon oxide grows. When the entire grooves 11b are shaded, the silicon oxide that has been vapor-deposit on the grooves 11b will no longer grow, due to the shadowing effect. Therefore, even in the case where the relationship between the height H and distance L of the bumps 11a and the incident angle θ of silicon is $L \geq H \cdot \tan\theta$, voids can be obtained between active material particles 14 which are formed on the respective bumps 11a.

In the step of forming the first active material layer in the above-described method, as has been described with reference to FIG. 3(b), silicon is supplied onto the surface of the current collector 11 along the normal direction D of the current collector 11; however, the direction of supplying silicon (incident direction) does not need to be generally identical to the normal direction D. Preferably, the angle between the incident direction of silicon and the normal direction D of the current collector 11 (incident angle) is sufficiently small, e.g.

within ±20°. When the incident angle of silicon atoms is within ±20°, the aforementioned shadowing effect hardly occurs, so that the first active material layer 12 can be formed more uniformly on the entire surface of the current collector 11, i.e., not only on the upper faces of the bumps 11a, but also on the side faces of the bumps 11a and the grooves 11b.

Either a sputtering technique or a vapor deposition technique can be suitably applied to the formation of the first active material layer 12. A first active material layer 12 which is formed by a sputtering technique or a vapor deposition technique can more effectively improve the adhesion strength between the active material particles 14 and the current collector 11. Regardless of which one of these methods is used, generally equal effects will be obtained, given the same oxygen ratio and thickness of the first active material layer 12. From the standpoint of mass producibility, it is preferable to use the vapor deposition technique to form a first active material layer 12 having a particularly large thickness (e.g. 0.5 µm or more).

In the step of forming the second active material layer, as has been described with reference to FIG. 3(d), silicon is allowed to strike the surface of the current collector 11 from an incident direction E which is at an angle of 60° with respect to the normal direction D of the current collector 11; however, the incident angle θ of silicon is not limited thereto. Although depending on the ruggedness pattern which is formed on the surface of the current collector 11, the preferable range of the incident angle θ is no less than 20° and no more than 90°, for example, whereby active material particles having a desired growth direction can be formed.

The formation of the first active material layer 12 and the formation of the second active material layer 15 may be performed within the same vacuum chamber. Alternatively, after forming the first active material layer 12 within a vacuum chamber, it may be taken out of the vacuum chamber, and it may subsequently placed again in the same vacuum chamber, or a different vacuum chamber, to carry out formation of the second active material layer 15.

Moreover, the formation of the first active material layer 12 and the second active material layer 15 may be performed while keeping the current collector 11 fixed within the vacuum chamber, or the current collector 11 may be allowed to travel within the vacuum chamber by using a roller, and the first active material layer 12 and the second active material layer 15 may be formed on the roller (substrate cooling roll). An endless belt may be used instead of a roller, and the first active material layer 12 and the second active material layer 15 may be formed on the current collector 11 traveling on a linear portion of the endless belt. Note that, regardless of whether the current collector 11 is fixed within the vacuum chamber or allowed to travel, in the step of forming the first active material layer, the current collector 11 and the evaporation source must be placed so that the surface of the current collector 11 and the incident direction of silicon atoms from the evaporation source (e.g. silicon) are generally perpendicular; and in the step of forming the second active material layer, the current collector 11 and the evaporation source must be placed so that the surface of the current collector 11 and the incident direction E of silicon atoms from the evaporation source constitute a predetermined angle θ.

Next, with reference to the drawings, an exemplary construction of a lithium-ion secondary battery which is obtained by applying the negative electrode 10 of the present embodiment will be described.

Figure 4:
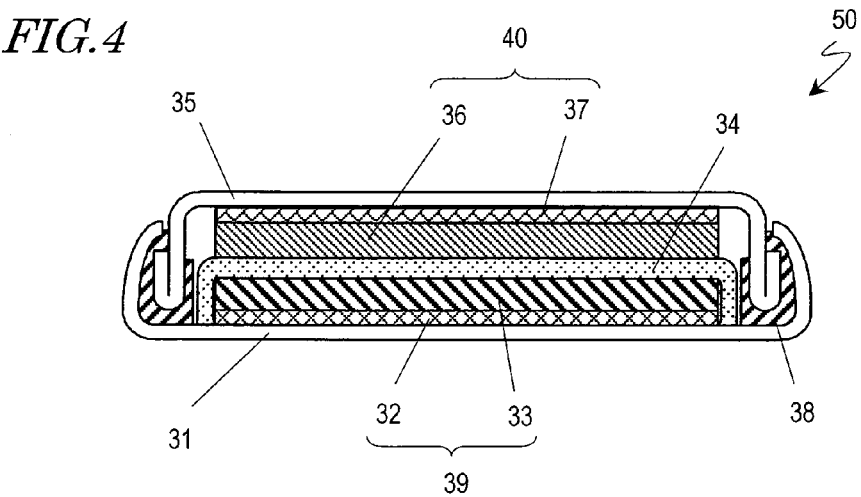
FIG. 4 A schematic cross-sectional view showing a lithium-ion secondary battery according to an embodiment of the present invention.

FIG. 4 is a schematic cross-sectional view illustrating a coin-type lithium-ion secondary battery in which the negative electrode of the present embodiment is used. The lithium-ion secondary battery 50 includes a negative electrode 40, a positive electrode 39, and a separator 34 provided between the negative electrode 10 and the positive electrode 39, the separator 34 being composed of a microporous film or the like. The positive electrode 39 includes a positive electrode current collector 32 and a positive electrode mixture layer 33 which contains a positive-electrode active material. The negative electrode 40 includes a negative electrode current collector 37 and a negative electrode active material layer 36 which contains $SiO_x$. Via the separator 34, the negative electrode 40 and the positive electrode 39 are disposed so that the negative electrode active material layer 36 and the positive electrode mixture layer 33 oppose each other. The separator 34 is disposed on the positive electrode 39, and contains an electrolyte solution as necessary. Together with an electrolyte having lithium-ion conductivity, the negative electrode 40, the positive electrode 39, and the separator 34 are accommodated within the case 31 by a sealing plate 35 having a gasket 38. Although not shown, a stainless steel spacer for filling up the space (shortage of intra-case height) in the case 31 is placed inside the case 31. The case 31 is sealed by crimping the sealing plate 35 at the periphery via the gasket 38.

The negative electrode 40 has a construction as described above with reference to FIG. 1. In other words, the surface of the negative electrode current collector 37 opposing the positive electrode mixture layer 33 has a ruggedness pattern as described above with reference to FIG. 1. Moreover, the negative electrode active material layer 36 includes a first active material layer covering the surface of the negative electrode current collector 37 and a second active material layer which is formed on the first active material layer and includes a plurality of active material particles.

In the present embodiment, there is no particular limitation as to the constituent elements of the lithium secondary battery 50 other than the negative electrode 40. For example, lithium-containing transition metal oxides such as lithium cobaltate ($LiCoO_2$), lithium nickelate ($LiNiO_2$), and lithium manganate ($LiMn_2O_4$) can be used for the positive electrode mixture layer 33, although this is not a limitation. Moreover, the positive electrode mixture layer 33 may be composed only of a positive-electrode active material, or composed of a mixture which contains a positive-electrode active material, a binder agent, and a conductive agent. Moreover, the positive electrode mixture layer 33 may be composed of a plurality of active material particles, as is the second active material layer of the negative electrode active material layer 36. For the positive electrode current collector 32, it is preferable to use a metal such as Al, an Al alloy, or Ti.

As the lithium-ion conductive electrolyte, various solid electrolytes or nonaqueous electrolyte solutions which have lithium-ion conductivity are used. As the nonaqueous electrolyte solution, what is obtained by dissolving lithium salt in a nonaqueous solvent is preferably used. There is no particular limitation as to the composition of the nonaqueous electrolyte solution. There is no particular limitation as to the separator and the outer case, either, and any material that is used for lithium secondary batteries of various forms can be used without particular limitations.

Note that the negative electrode of the present embodiment is not limited to the coin-type lithium-ion secondary battery 50 as shown in FIG. 4, but is applicable to lithium secondary batteries of various shapes, e.g., cylindrical, flat, or prismatic. Moreover, the manner of sealing the lithium secondary battery and the materials of the respective elements composing the battery are not particularly limited either. Furthermore, it is also applicable to a non-aqueous electrolyte secondary battery other than a lithium secondary battery.

Example and Comparative Example

Hereinafter, an Example of the present invention and a Comparative Example will be described. As the Example, ten negative electrodes No. 1 to No. 10 differing in thickness, oxygen ratio, formation method, and the like of the first active material layer were produced. As the Comparative Example, a negative electrode (negative electrode A) not having a first active material layer was produced, and their methods and structures will be described. Moreover, the characteristics of the negative electrodes of the Example and the Comparative Example and batteries incorporating these negative electrodes were evaluated and compared, and the evaluation method and the evaluation results will be described.

(i) Fabrication of the Negative Electrode of the Example
<Fabrication of Current Collector>

A current collector of the present Example was produced by the following method. First, a negative type photoresist (thickness: e.g. 10 µm) was applied on a rolled copper foil having a thickness of 18 µm. Next, by using a negative type mask having a pattern of diamond shapes, the resist film on the copper foil was subjected to exposure and development, thereby forming on the resist film a plurality of apertures for exposing the surface of the current collector. Next, by electrolytic technique, copper particles were allowed to deposit on the surface of the current collector exposed through the apertures, thus forming bumps whose upper face has diamond-shaped quadrangular prism structures. Thereafter, the resist film was removed. In this manner, a current collector having a plurality of bumps of quadrangular prism shape placed in a regular arrangement on the surface was obtained.

Figure 5:
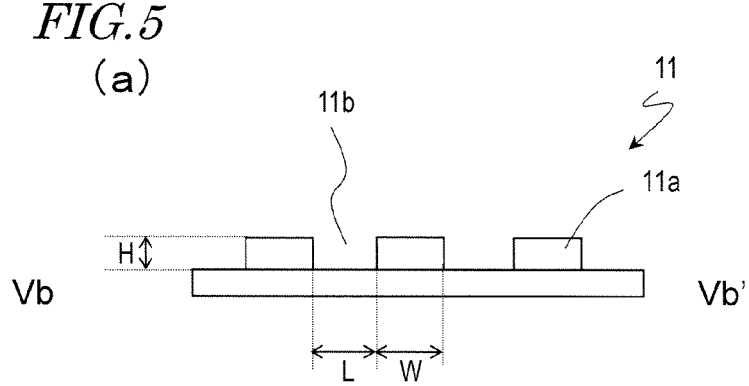
FIGS. 5 (a) and (b) are, respectively, a cross-sectional view and a plan view for describing the structure of a current collector according to an Example of the present invention.
Figure 5:
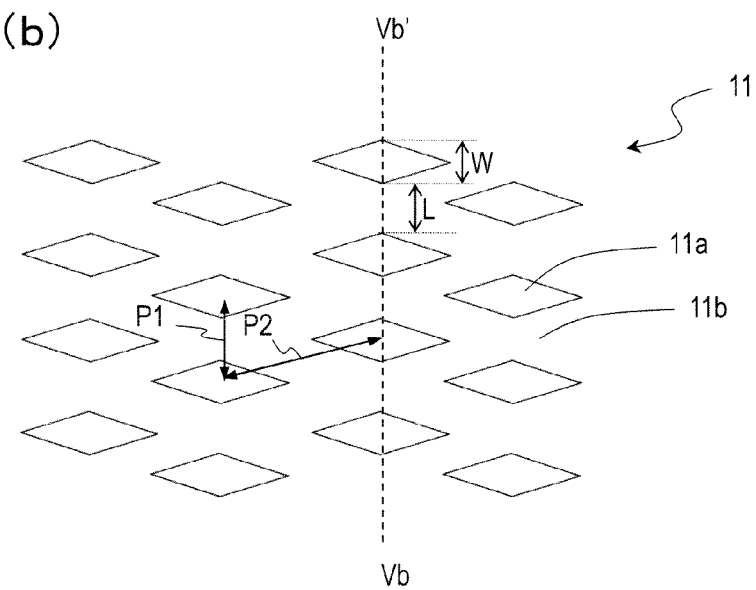

FIGS. 5(a) and (b) are diagrams for describing the structure of current collector obtained by the above method, where (a) is a cross-sectional view taken along line Vb-Vb' of (b) and containing a direction which is perpendicular to the surface of the current collector and along which active material particles are to be grown in a subsequent process, and (b) is a plan view showing the surface of the current collector from the normal direction.

On the surface of the current collector 11 of the present Example, a plurality of bumps 11a were placed in a regular arrangement as shown in FIG. 5(b). The upper face of each bump 11a had a diamond shape as viewed from the normal direction of the current collector 11, the diamond shape having a diagonal length of 12 µm×28 µm. The shortest distance P1 between the centers of adjoining bumps 11a was 22 µm, and the arraying pitch P2 along a direction parallel to each side of the diamond shape was 31 µm. Moreover, the distance L between adjoining bumps 11a in the cross section shown in FIG. 5(a) was 10 µm. The height H of each bump 11a was 10 µm; the upper face of each bump 11a had an Ra of 0.6 µm and a ten point-average height Rz of 0.9 µm. Note that the ten point-average height Rz as mentioned herein refers to the ten point-average roughness Rz defined under the Japanese Industrial Standards (JISB 0601-1994).

<Formation of First Active Material Layer>

After producing ten current collectors by the above method, first active material layers were formed on these current collectors, thus obtaining samples No. 1 to No. 10.

The fabrication of the first active material layer of samples No. 1 to No. 8 was performed by forming a silicon oxide film covering the entire surface of the current collector with a reactive sputtering technique, by using silicon as a target and oxygen gas as a reactive gas. The formation conditions are shown below. However, the amount of oxygen gas introduced and the film formation time were varied among samples, thus forming first active material layers with different oxygen ratios and thicknesses.

RF Sputtering Conditions
size of current collector: 10 cm×10 cm
distance between current collector and target: 7 cm
introduced gas: Ar (25 sccm), oxygen (0 sccm to 5 sccm)
output power: 1.3 kW
film formation rate: 1 nm/second On the other hand, as the first active material layers of samples No. 9 and No. 10, a silicon oxide film covering the entire surface of a current collector was formed with a reactive evaporation technique, by using silicon as a target and oxygen gas as a reactive gas. Herein, by using a vapor deposition apparatus 60 shown in FIGS. 7(a) and (b), reactive evaporation was performed while keeping a platform 63 of the vapor deposition apparatus 60 fixed parallel to the horizontal plane 69, so that the incident angle θ of silicon with respect to the current collector was about 0°. In samples No. 9 and No. 10, the film formation time was varied, thereby forming first active material layers with different thicknesses. Since the vapor deposition apparatus 60 is also employed in the subsequent step of forming the second active material layer, and the construction thereof will be described in detail later.

Vacuum Evaporation Conditions
current collector ⌀ size: 10 cm×10 cm
distance between current collector and target: 15 cm
introduced gas: oxygen (70 sccm)
EB output power: 4 kW
film formation rate: 8 nm/second The thickness and oxygen ratio x of the first active material layer of each sample are shown in Table 1. The oxygen ratio x of the first active material layer was obtained by measuring the Si amount of each sample by ICP Atomic Emission Spectrometry and the oxygen amount by combustion analysis technique, and subjecting the resultant Si amount and oxygen amount to calculation.

TABLE 1

| sample | thickness [µm] | oxygen ratio x |
|---|---|---|
| No. 1 | 0.02 | 0.1 |
| No. 2 | 0.05 | 0.1 |
| No. 3 | 0.50 | 0.1 |
| No. 4 | 0.02 | 0.3 |
| No. 5 | 0.05 | 0.3 |
| No. 6 | 0.50 | 0.3 |
| No. 7 | 0.50 | 0.5 |
| No. 8 | 0.50 | 0.7 |
| No. 9 | 0.50 | 0.7 |
| No. 10 | 1.00 | 0.7 |

Figure 6:
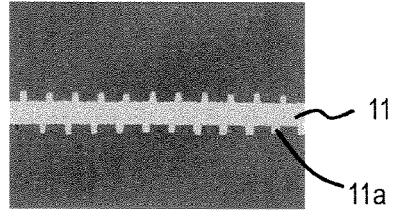
FIG. 6 (a) is an electron micrograph of a current collector according to an Example of the present invention having a first active material layer formed thereon, showing the shape of a cross section perpendicular to the current collector surface; and (b) is an enlarged photograph of (a).
Figure 6:
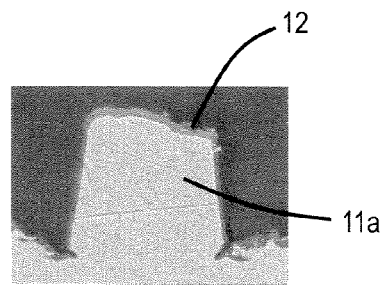

FIG. 6 is a diagram showing results of electron microscope observation of sample No. 3 among the aforementioned samples, where (a) is a cross-sectional view perpendicular to the surface of the current collector, and (b) is an enlarged cross-sectional view of a bump formed on the surface of the current collector. From these figures, it was found that the bumps 11a were arrayed on the surface of the current collector 11, and that the first active material layer 12 having a thickness of about 0.5 µm had been formed so as to cover the entire surface of the current collector 11, including the upper faces and side faces of the bumps 11a.

Note that, in sample No. 3 shown in FIG. 6(a), the plurality of bumps 11a are formed on both faces of the current collector 11. This is an adaptation to a battery of the structure in which a positive electrode and a negative electrode are stacked so as to sandwich a separator therebetween, as in a cylindrical lithium secondary battery, for example. In an adaptation to a coin-type lithium secondary battery, for example, it suffices if at least one of the surfaces of the current collector 11 has the bumps 11a and is covered with the first active material layer 12.

<Formation of Second Active Material Layer>

Next, by forming a second active material layer on each of samples No. 1 to No. 10 mentioned above, negative electrodes No. 1 to No. 10 of the Example were produced.

The formation of the second active material layers of negative electrodes No. 1 to No. 10 was performed by an oblique vapor deposition technique using a vapor deposition apparatus (manufactured by ULVAC, Inc.) with an electron beam as heating means (not shown).

Firstly, the construction of the vapor deposition apparatus used in the present Example will be described. FIGS. 7(a) and (b) are diagrams for describing the vapor deposition apparatus used in the present Example, which are schematic cross-sectional views as viewed from directions that are 90° apart.

Figure 7:
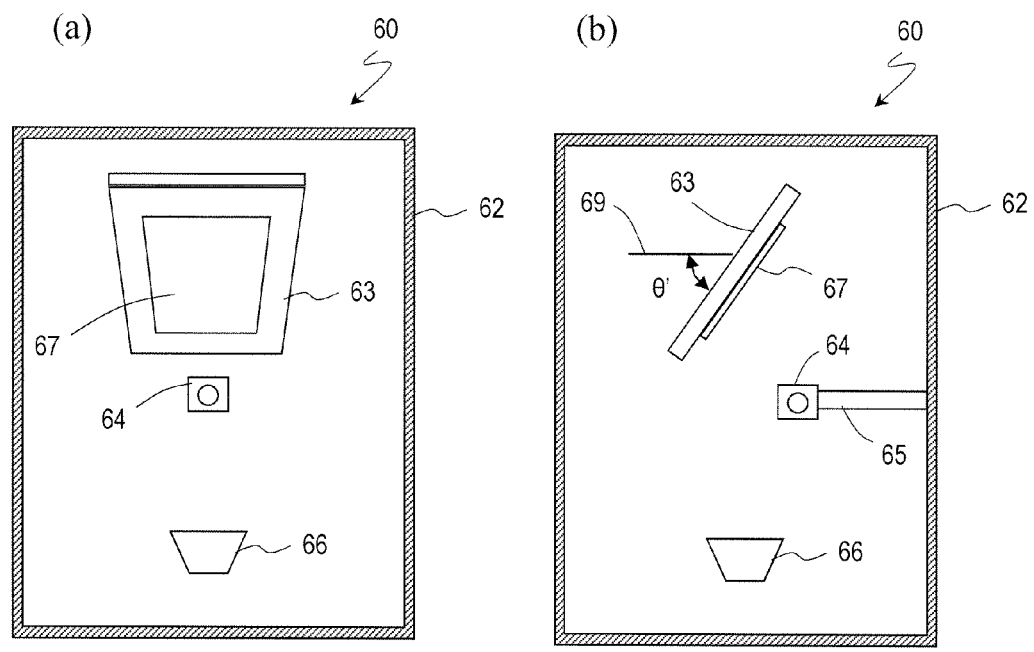
FIGS. 7 (a) and (b) are diagrams for describing the construction of a vapor deposition apparatus used in the Example, which are schematic diagrams as viewed from directions that are 90° apart.

The vapor deposition apparatus 60 shown in FIG. 7 includes a chamber 62 and an evacuation pump (not shown) for evacuating the chamber 62. Inside the chamber 62 are a platform 63 on which to fix the current collector (each sample mentioned above) 67 having the first active material layer formed thereon, tubing 65 for introducing oxygen gas into the chamber 62, a nozzle 64 which is connected to the tubing 65 for emitting the oxygen gas, and an evaporation source 66 for supplying silicon onto the surface of the sample 67. Although not shown, an electron beam heating means for evaporating the material of the evaporation source 66 is also comprised. The tubing 65 is connected to an oxygen cylinder via a mass flow controller. The nozzle 64 is positioned so that the oxygen gas emitted from the nozzle 64 is supplied onto the surface of the current collector 67. The evaporation source 66 is disposed vertically below the platform 63. In the present Example, as the evaporation source 66, silicon with a purity of 99.9999% (manufactured by Kojundo Chemical Lab. Co., Ltd) was used.

Next, the method for forming the second active material layers of negative electrodes No. 1 to No. 9 will be described. Herein, by using the aforementioned vapor deposition apparatus 60, vapor deposition was performed on the first active material layer of each of samples No. 1 to No. 9 from a direction tilted by 60° with respect to the normal of the current collector, thus forming the second active material layer.

First, each sample was placed on the platform 63 so that its side on which the first active material layer was formed would face upward. The platform 63 was rotated, and fixed at a position where the angle θ' of the platform 43 with respect to the horizontal plane 69 was 60° (θ'=60°), as shown in FIG. 7(b). Note that FIG. 7(b) is a cross-sectional view which is perpendicular to the current collector surface and which contains the evaporation direction, where the "horizontal plane" refers to the face 69 which is perpendicular to the direction of the material (silicon) of the evaporation source 66 being vaporized and heading toward the platform 63. Therefore, the tilting angle θ' of the platform 63 is equal to the incident angle θ of silicon with respect to the sample 67 which is placed on the platform 63. By adjusting this, the growth direction of the active material particles to be grown on the surface of the first active material layer of the sample 67 can be controlled.

In this state, silicon was allowed to strike the surface of the first active material layer of the sample 67 while introducing oxygen gas through the nozzle 64. In the present Example, the acceleration voltage and the emission of the electron beam for irradiating the evaporation source 66 were set to −9 kV and 400 mA, respectively. Together with the oxygen having been introduced into the chamber 62 (flow rate of oxygen gas: 10 sccm), the vapor of elemental silicon from the evaporation source 66 was supplied onto the surface of the sample 67 placed on the platform 63, whereby active material particles composed of a compound containing silicon and oxygen (silicon oxide) grew on the surface of the sample 67. In this manner, a second active material layer composed of a plurality of active material particles was obtained on the first active material layer. The vapor deposition time was adjusted so that the thickness of the second active material layer was 22 μm.

On the other hand, the second active material layer of negative electrode No. 10 was formed by, using the aforementioned vapor deposition apparatus 60, performing a vapor deposition step through a plurality of substeps on the first active material layer of sample No. 10 while switching the evaporation direction.

First, sample No. 10 was placed on the platform 63 so that its side on which the first active material layer was formed would face upward. The platform 63 was rotated, and fixed at a position where the angle θ' of the platform 43 with respect to the horizontal plane 69 was 60° (θ'=60°), as shown in FIG. 7(b). A vapor deposition was performed in this state, and silicon oxide was grown to a thickness of 3 μm (first substep of vapor deposition step). Note that, as described earlier, the angle θ' is equal to the incident angle θ of silicon with respect to the sample placed on the platform 63. Next, the platform 43 was rotated, and fixed at a position where the aforementioned angle θ' was −60°, and silicon oxide was further grown to a thickness of 3 μm (second substep of vapor deposition step). In this manner, while switching the angle θ' between 60° and −60°, the vapor deposition step was repeated up to a seventh substep, thus obtaining a second active material layer with a thickness of 21 μm.

For each of negative electrodes No. 1 to No. 10 of the Example obtained with the above method, the Si amount was measured by ICP Atomic Emission Spectrometry (ICP Atomic Emission Spectrometer) and the oxygen amount by combustion analysis technique, an average value x of the oxygen ratio in the second active material layer was calculated from the Si amount and oxygen amount measurement values. It was thus found that, as shown in Table 2, the oxygen ratio x was 0.3 and the second active material layer had a chemical composition represented as $SiO_{0.3}$ in any of the negative electrodes.

Note that, since these negative electrodes include the first active material layer in addition to the second active material layer (active material particles), the Si amount and oxygen amount obtained through the above measurements would also include the Si amount and oxygen amount of the first active material layer. However, the thickness of the first active material layer is much smaller than the thickness of the second active material layer, and the influence of the Si amount and oxygen amount of the first active material layer exerted on the oxygen ratio of the second active material layer is very small. Therefore, in the present Example, the oxygen ratio of all active materials contained in the negative electrode is regarded as the oxygen ratio (x) of the second active material layer.

Figure 8:
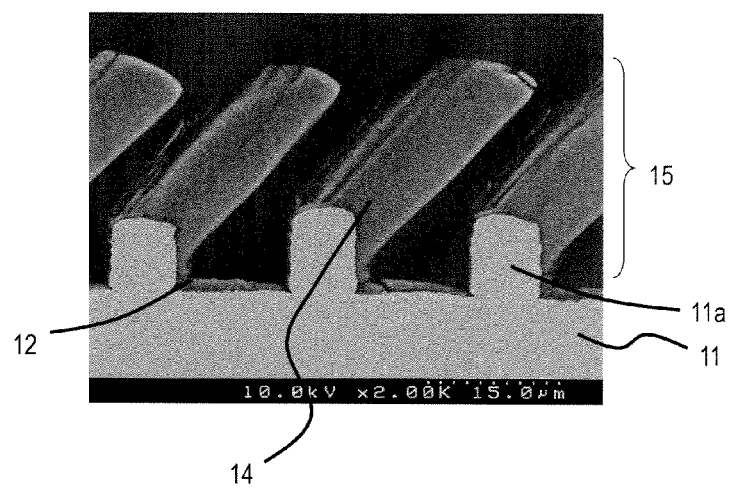
FIG. 8 An electron micrograph showing the shape of a cross section of a negative electrode according to an Example of the present invention, the cross section being perpendicular to the current collector surface and containing an evaporation direction of silicon.

FIG. 8 is a diagram showing results of electron microscope observation of negative electrode No. 3 among the aforementioned negative electrodes, being a cross-sectional view which is perpendicular to the surface of the current collector 11 and contains the incident direction of silicon when forming the active material particles. As can be seen from FIG. 8, a plurality of bumps 11a had been formed on the surface of the current collector 11, and the first active material layer 12 having a thickness of about 0.5 μm had been formed so as to cover the entire surface (including the side faces of the bumps 11a). Furthermore, it was confirmed that the active material particles 14 had grown on each bump 11a on the surface of the current collector 11, via the first active material layer 12.

(ii) Fabrication of Negative Electrode of Comparative Example

As a Comparative Example, a current collector having a plurality of bumps on the surface was produced by a method similar to that of the Example, but a second active material layer was formed by growing active material particles directly on the bumps of the current collector surface, without forming a first active material layer. The second active material layer in the Comparative Example was formed by a method and conditions similar to those of the method of forming the second active material layer according to the Example, by using the vapor deposition apparatus shown in FIG. 7. In this manner, negative electrode A of the Comparative Example was obtained.

The oxygen ratio of negative electrode A was measured by a method similar to that of Example, which resulted in the same value (x=0.3) as that of each negative electrode of the Example.

Figure 9:
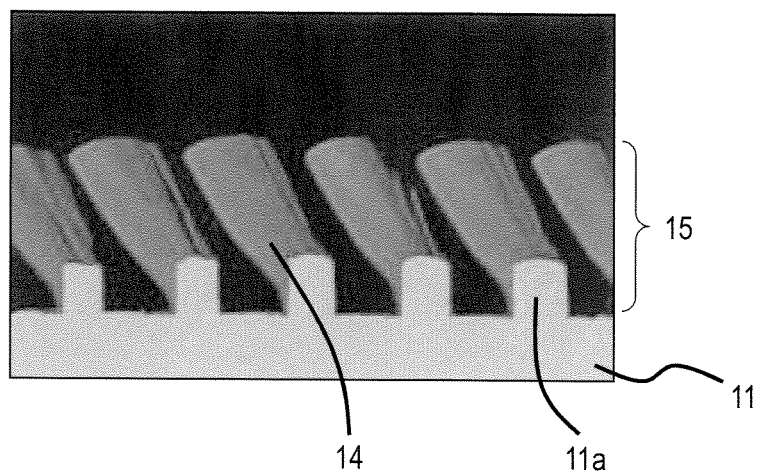
FIG. 9 An electron micrograph showing the shape of a cross section of a negative electrode according to a Comparative Example, the cross section being perpendicular to the current collector surface and containing an evaporation direction of silicon.

FIG. 9 is a diagram showing a result of electron microscope observation of negative electrode A, being a cross-sectional view which is perpendicular to the surface of the current collector 11 and contains the incident direction of silicon. From FIG. 9, it was confirmed that the active material particles 14 had been formed directly on the bumps 11a of the current collector 11. It was also confirmed that no covering of the active material was present in the regions of the surface of the current collector 11 that were shaded with respect to the incident direction of silicon, i.e., above the side faces of the bumps 11a located opposite from the incident direction and above the grooves 11b.

(iii) Evaluation of Negative Electrodes

<Measurement of Peeling Strength>

For each of the negative electrodes of the Example and the Comparative Example produced by methods (i) and (ii) above, the adhesion strength (peeling strength) of the active material with respect to the current collector 11 was measured by using a tack testing machine (TAC-II manufactured by Rhesca Corporation), and the measurement method and the results will be described.

First, a 2 cm×3 cm sample for peeling strength measurement was cut out from each negative electrode. Next, a double-sided tape (No. 515 manufactured by Nitto Denko Corporation) was attached to the tip of a probe (tip diameter: 2 mm) of the tack testing machine, and, with the double-sided tape, the probe was taped to an opposing position from the probe on the surface of the sample for peeling strength measurement. In the measurement, the pressing speed was set to 30 mm/min; the pressing time 10 seconds; the load 400 gf; and the lifting velocity 600 mm/min. The peeling strengths of the negative electrodes obtained from the measurements are shown in Table 2.

TABLE 2

| negative electrode | | first active material layer | | second active material layer | peeling strength [kgf/cm²] |
|---|---|---|---|---|---|
| | | thickness [μm] | oxygen ratio | oxygen ratio | |
| Example | No. 1 | 0.02 | 0.1 | 0.3 | 26.3 |
| | No. 2 | 0.05 | 0.1 | 0.3 | 26.8 |

TABLE 2-continued

| negative electrode | | first active material layer | | second active material layer | peeling strength [kgf/cm²] |
|---|---|---|---|---|---|
| | | thickness [μm] | oxygen ratio | oxygen ratio | |
| | No. 3 | 0.50 | 0.1 | 0.3 | 28.3 |
| | No. 4 | 0.02 | 0.3 | 0.3 | 26.8 |
| | No. 5 | 0.05 | 0.3 | 0.3 | 26.9 |
| | No. 6 | 0.50 | 0.3 | 0.3 | 28.7 |
| | No. 7 | 0.50 | 0.5 | 0.3 | 29.3 |
| | No. 8 | 0.50 | 0.7 | 0.3 | 28.4 |
| | No. 9 | 0.50 | 0.7 | 0.3 | 29.3 |
| | No. 10 | 1.00 | 0.7 | 0.3 | 29.4 |
| Comparative Example | A | — | — | 0.3 | 20.2 |

From the results shown in Table 2, it was found that negative electrodes No. 1 to No. 10 of the Example including the first active material layer had higher peeling strengths than that of negative electrode A lacking the first active material layer. Thus, it was confirmed that the adhesion between the active material and the current collector surface can be improved by a construction in which a first active material layer is provided between the active material particles and the current collector.

Moreover, between negative electrodes No. 8 and No. 9, the peeling strength of the active material was generally equivalent. These results indicated that, given the same thickness and oxygen ratio of the first active material layer, a generally equivalent peeling suppressing effect is obtained regardless of whether the first active material layer is formed by a reactive sputtering technique (negative electrode No. 8) or by a reactive evaporation (negative electrode No. 9).

<Charge-Discharge Test for Battery>

By using negative electrodes No. 1 to No. 10 and negative electrode A of the Comparative Example shown in Table 2, coin batteries No. 1 to No. 10 and battery A were produced in which lithium metal was used as a counter electrode, and they were subjected to a charge-discharge test. In these batteries, an electrode for a coin battery fabricated by using the negative electrodes of the Example or the Comparative Example serves as a positive electrode, and metal lithium serves as a negative electrode. However, similar results to the followings will be obtained also by producing batteries in which the aforementioned electrode for a coin battery is a negative electrode and subjecting them to a charge-discharge test.

First, each of the above negative electrodes (negative electrodes No. 1 to No. 10 and negative electrode A) was shaped into a circle with a diameter of 12.5 mm, thus fabricating an electrode for a coin battery. Next, metal lithium which had been punched into a circle with a diameter of 15 mm (thickness: 300 μm) was affixed to a sealing plate. Thereafter, a microporous separator of polyethylene manufactured by Asahi Kasei Corporation, having a thickness of 20 μm, was placed on the metal lithium circle, upon which an electrode for a coin battery was placed. Next, an electrolytic solution of 1.2M LiPF$_6$, adjusted so that ethylene carbonate/ethyl methyl carbonate/diethyl carbonate=3/5/2 (volume ratio) were added dropwise. A stainless steel plate having a thickness of 100 μm was placed for thickness adjustment, and after placing a case thereupon, a crimper was used for sealing. In this manner, batteries No. 1 to No. 10 and battery A were obtained.

Each resultant battery was subjected to a charge-discharge test under the following conditions, using a charging and discharging apparatus.
    charging: constant current charging 0.1 mA,
    end voltage 0 V, pause time 30 minutes
    discharging: constant current discharging 0.1 mA,
    end voltage 1.5 V The irreversible capacity at the first cycle in the aforementioned charge-discharge test was ascertained, producing results as shown in Table 3. Note that an irreversible capacity is defined by the following equation.

$$\text{irreversible capacity (\%)} = 100 - \{(\text{discharge capacity})/(\text{charge capacity})\} \times 100$$

Furthermore, after the charge-discharge test, these batteries were disassembled for observation to confirm the presence or absence of peeling of the active material from the current collector. These results are also shown in Table 3.

TABLE 3

| battery | | irreversible capacity [%] | active material peeling |
|---|---|---|---|
| Example | No. 1 | 45 | NO |
| | No. 2 | 40 | NO |
| | No. 3 | 31 | NO |
| | No. 4 | 38 | NO |
| | No. 5 | 35 | NO |
| | No. 6 | 30 | NO |
| | No. 7 | 32 | NO |
| | No. 8 | 33 | NO |
| | No. 9 | 32 | NO |
| | No. 10 | 33 | NO |
| Comparative Example | A | 74 | YES |

As shown in Table 3, in battery A of the Comparative Example, the irreversible capacity was so high as 74%. As can be seen from the results of disassembling and observing battery A after battery charging and discharging, this is presumably because the active material particles peeled off the current collector surface. On the other hand, the irreversible capacity of each of batteries No. 1 to No. 10 of the Example was much lower than the irreversible capacity of battery A of the Comparative Example. This is considered to be because peeling of the active material was suppressed by providing the first active material layer between the active material particles and the current collector, whereby lowering of the irreversible capacity was suppressed.

Furthermore, it has been confirmed through a study conducted by the inventors that an irreversible capacity of about 30 to 35% (reference value) exists in a negative electrode active material layer having the same chemical composition ($SiO_{0.3}$) as that of the second active material layer of the negative electrode. Note that this reference value is a material-specific value which is determined based on the amount of introduced oxygen and the film formation time, irrespective of the shape of the negative electrode active material layer. The irreversible capacities of batteries No. 3 to No. 10 were about the same as the aforementioned reference value, which indicated that the active material composing the second active material layer was effectively utilized in batteries No. 3 to No. 10. On the other hand, the irreversible capacities of batteries No. 1 and No. 2 were greater than the aforementioned reference value, although reduced from that of battery A of the Comparative Example. This is presumably because the oxygen ratio in the first active material layer was small (x=0.1) so that the first active material layer was easy to expand, and also because the first active material layer was relatively thin, thus resulting in a lower adhesion between the first active material layer and the current collector surface than in batteries No. 3 to No. 10.

From the above evaluation results, it was confirmed that the adhesion between the second active material layer and the current collector can be improved by forming a first active material layer between the current collector and the active material particles, whereby an increase in irreversible capacity due to peeling of the active material can be suppressed.

INDUSTRIAL APPLICABILITY

A negative electrode according to the present invention is applicable to lithium secondary batteries of various forms, but will be particularly advantageous when applied to a lithium secondary battery which is required to have a high capacity and good cycle characteristics. There is no particular limitation as to the shape of the lithium secondary battery to which the negative electrode according to the present invention is applicable, and any shape may be used, e.g., coin-type, button-type, sheet-type, cylindrical-type, flat-type, prismatic-type. The configuration of the electrode group, which consists of the positive electrode, the negative electrode, and the separator, may be a wound type or a stacked type. The battery size may be small, as used for small-sized portable devices or the like, or large, as used for electric vehicles or the like.

For example, a lithium secondary battery according to the present invention can be used as a power supply of a mobile information terminal, a portable electronic device, a small power storage device for households, a motorcycle, an electric vehicle, a hybrid electric vehicle, or the like. However, there is no particular limitation as to the usage of such devices.

The invention claimed is:

1. A negative electrode for a lithium secondary battery, comprising:
    a current collector having a plurality of bumps on a surface thereof;
    a first active material layer formed on the current collector; and
    a second active material layer being formed on the first active material layer and including a plurality of active material particles, wherein:
    each of the plurality of active material particles is located on a corresponding bump of the current collector,
    the first active material layer has a chemical composition represented as $SiO_x$, where $0.1 \leq x < 1$, and the plurality of active material particles have a chemical composition represented as $SiO_y$, where $0 < y < 1$,
    an area of contact between the current collector and the first active material layer is larger than an area of contact between the plurality of active material particles and the first active material layer, and
    the plurality of active material particles are arranged with spaces therebetween and do not contact with each other.

2. The negative electrode for a lithium secondary battery of claim 1, wherein the x in the chemical composition of the first active material layer is different from the y in the chemical composition of the plurality of active material particles.

3. The negative electrode for a lithium secondary battery of claim 1, wherein the plurality of bumps are placed in a regular arrangement on the surface of the current collector.

4. The negative electrode for a lithium secondary battery of claim 1, wherein the first active material layer has a thickness of no less than 0.01 μm and no more than 3 μm.

5. The negative electrode for a lithium secondary battery of claim 1, wherein a growth direction of the plurality of active material particles is tilted with respect to a direction perpendicular to a plane which can be obtained by averaging out a ruggedness on the surface of the current collector.

6. The negative electrode for a lithium secondary battery of claim 5, wherein an angle of the growth direction of the plurality of active material particles with respect to a normal direction of the surface of the current collector is different from an angle of a growth direction of the first active material layer with respect to the normal direction of the surface of the current collector.

7. The negative electrode for a lithium secondary battery of claim 6, wherein the angle of the growth direction of the plurality of active material particles is greater than the angle of the growth direction of the first active material layer.

8. A lithium secondary battery comprising:
   a positive electrode capable of occluding and releasing lithium ions;
   the negative electrode for a lithium secondary battery of claim 1;
   a separator disposed between the positive electrode and the negative electrode for a lithium secondary battery; and
   an electrolyte having lithium-ion conductivity.

9. A method of producing the negative electrode for a lithium secondary battery according to claim 1, comprising:
   (A) a step of providing the current collector having the plurality of bumps on the surface thereof;
   (B) a step of forming, on the surface of the current collector, the first active material layer having the chemical composition represented as $SiO_x$, where $0.1 \leq x < 1$; and
   (C) a step of forming, on each bump of the current collector via the first active material layer, the active material particle having the chemical composition represented as $SiO_y$, where $0 < y < 1$, thereby forming the second active material layer including the plurality of active material particles,
   wherein the plurality of active material particles are arranged with spaces therebetween and do not contact with each other.

10. The method of claim 9, wherein:
    step (B) includes a step of supplying silicon for the current collector from a direction constituting an angle within ±20° with respect to a normal direction of the surface of the current collector, and
    step (C) includes a step of supplying silicon for the current collector from a direction constituting an angle of no less than 20° and no more than 90° with respect to the normal direction of the surface of the current collector.

11. The method of claim 9, wherein step (B) is performed by a sputtering technique.

12. The method of claim 9, wherein step (B) is performed by a vapor deposition technique.

* * * * *